(12) United States Patent
Ogden

(10) Patent No.: US 7,396,403 B1
(45) Date of Patent: Jul. 8, 2008

(54) CONCRETE REINFORCED WITH ACRYLIC COATED CARBON FIBERS

(75) Inventor: J. Herbert Ogden, Valley Forge, PA (US)

(73) Assignee: Ogden Technologies, Inc., Valley Forge, PA (US)

( * ) Notice: Subject to any disclaimer, the term of this patent is extended or adjusted under 35 U.S.C. 154(b) by 0 days.

(21) Appl. No.: 11/356,720

(22) Filed: Feb. 17, 2006

(51) Int. Cl.
| C04B 24/04 | (2006.01) |
| C04B 14/38 | (2006.01) |
| C04B 16/04 | (2006.01) |
| C04B 20/10 | (2006.01) |

(52) U.S. Cl. .................. 106/810; 106/714; 106/717; 106/724; 106/728; 106/790; 106/802; 106/814; 524/5

(58) Field of Classification Search ............. 106/714, 106/717, 724, 728, 802, 810, 814, 790; 524/5, 524/424
See application file for complete search history.

(56) References Cited

U.S. PATENT DOCUMENTS

| 3,949,124 | A | | 4/1976 | Jilla |
| 5,366,600 | A | | 11/1994 | Westhof et al. |
| 5,422,174 | A | | 6/1995 | Shintani et al. |
| 5,685,902 | A | | 11/1997 | Tezuka et al. |
| 5,836,715 | A | | 11/1998 | Hendrix et al. |
| 6,263,629 | B1 | | 7/2001 | Brown, Jr. |
| 6,790,275 | B2 | * | 9/2004 | Macklin et al. ............ 106/644 |
| 6,962,201 | B2 | | 11/2005 | Brothers |

FOREIGN PATENT DOCUMENTS

| EP | 288070 | A2 | | 10/1988 |
| JP | 55-166877 | A | | 12/1980 |
| JP | 58-223659 | A | * | 12/1983 |
| JP | 62-226850 | A | | 5/1987 |
| JP | 2-69207 | A | | 3/1990 |
| JP | 02-275739 | A | | 11/1990 |
| JP | 3-150241 | A | | 6/1991 |
| JP | 3-180561 | A | * | 8/1991 |
| JP | 3-185176 | A | | 8/1991 |
| JP | 3-193645 | A | | 8/1991 |
| JP | 6-166954 | A | * | 6/1994 |
| JP | 07-66584 | A | | 3/1995 |
| JP | 8-325050 | A | | 12/1996 |
| JP | 2003-71377 | A | * | 3/2003 |

OTHER PUBLICATIONS

Derwent -Acc-No: 1990-166621, abstract of Japanese Patent Specification No. 02-105830A (Apr. 1900).*
TONE M-100 Monomer "Caprolactone Acrylate Monomer" The Dow Chemical Company, Midland, Michigan 48674 U.S.A. Product Brochure—Published Aug. 2004.
"Textile Applications" EOC Worldwide Info@eocgroup.com—edition Feb. 2004.
ACRALEN BS Polymer Latex GmbH & Co. KG Paul-Baumann-Stabe 1, 45764 Marl Product data sheet Edition PL v.2 Jun. 28, 2005.
Zydex Webpage ZYCRYL-77 "A Flexible Acrylic Polymer" textile-polymers.com, no date.
"A Catalytic Burner Using Propane and Toluene Alternately for the Drying of Textile Coatings" International Journal of Energy Research Int. J. Energy Res., 23, 543-556 (1999), no month.
Derwent Abstract No. 1982-03825J, abstract of Japanese Patent Specification No. 82-051703B (Nov. 1982).
Derwent Abstract No. 1983-03709k, abstract of Japanese Patent Specification No. 82-059635B (Nov. 1982).
Derwent Abstract No. 1990-166621, abstract of Japanese Patent Specification No. 02-105830A (Apr. 1990).
Derwent Abstract No. 2002-104044, abstract of Korean Patent Specification No. 341020B (Jun. 2002).
Photographs/diagram with captions "Wrapping bridge pier with carbon fiber fabric" and "Finished patch" (unknown author and unknown date).

* cited by examiner

*Primary Examiner*—Anthony J Green
(74) *Attorney, Agent, or Firm*—John F. A. Earley, III; Frank J. Bonini, Jr.; Harding, Earley, Follmer & Frailey, P.C.

(57) ABSTRACT

Concrete products and dry concrete mixes comprise cement, acrylic coated carbon fibers, and any optional components such as silica fumes, slag, stone, sand, and/or other aggregates. Preferably, the acrylic coated carbon fibers have a length of about 2½ inches to about 6 inches. A method of reinforcing concrete comprises mixing the cement, the acrylic coated carbon fibers, any optional components (such as silica fumes, slag, stone, sand, and/or other aggregates), and water to form a cement slurry, and letting the slurry set to cure the cement and form bonds between the cement and the carbon fibers, thereby obtaining reinforced concrete.

24 Claims, 1 Drawing Sheet

CONCRETE REINFORCED WITH ACRYLIC COATED CARBON FIBERS

BACKGROUND OF THE INVENTION

1. Field of the Invention

The invention relates to concrete products, and specifically concrete products reinforced with carbon graphite fibers.

2. Background of the Invention

Concrete is used for a wide variety of purposes, including road and bridge building, and, in particular, for the supports of elevated road beds and highways, as well as pilings and pillars. Concrete also has uses in building structures such as skyscrapers, high rises, including commercial as well as residential applications. Concrete may be formed on site, or alternatively, concrete may be pre-formed and moved to the site of use.

Concrete, by its nature, has been known to undergo degradation, deterioration, crumbling, cracking, as well as separation of the concrete matrix. This can occur over time or by exposure to extreme or repeated weather or other environmental conditions. Stresses, such as wear, movement, vibrations and the like may also contribute to the aforementioned problems associated with concrete.

It has become desirable in recent years to take protective measures in buildings, especially government buildings, against terrorist bombings. While structures, such as terrorist concrete barriers, have been used to help fortify buildings against bomb blasts, the force of a bomb blast often causes a portion of the terrorist concrete barrier to shatter, the shattered concrete debris created thereby projecting forcefully outwardly injuring or killing people it strikes and causing further damage to property near the bomb blast site.

A need exists for a way to reinforce the concrete to alleviate or minimize known problems and improve the life and function of the concrete.

SUMMARY OF THE INVENTION

It is an object of the invention to provide reinforced concrete products and a method for producing reinforced concrete products.

Another object of the present invention is to provide a concrete product with a matrix having good strength, including high impact resistance properties.

It is another object to provide concrete products that are reinforced with carbon fibers, and to provide a method of reinforcing concrete using carbon fibers.

It is a further object of the present invention to provide a reinforced concrete that is resistant to shattering.

These and other objects are provided by my invention.

In a preferred embodiment of the invention, the present invention comprises concrete having about 2½ inch long to about 6 inch long (more preferably about 2½ inch long to about 3½ inch long, and even more preferably about 3 inch long) acrylic coated carbon fibers evenly dispersed throughout the concrete matrix. In accordance with the invention, the inclusion of the acrylic coated carbon fibers having lengths of about 2½ inches long to about 6 inches long in the concrete improves the performance characteristics of the resulting concrete product with respect to degradation, deterioration, crumbling, cracking and separation, and the inclusion of such carbon fibers to the concrete increases the post-cracking resistance of the resulting concrete product that helps prevent deteriorated concrete from separating. The resulting concrete product has very high abrasion resistance.

In another preferred embodiment of the invention, the invention comprises. concrete having about 2½ inch long to about 6 inch long (more preferably about 2½ inch long to about 3½ inch long, and even more preferably about 3 inch long) acrylic coated carbon fibers evenly dispersed throughout the concrete matrix of the concrete, and small (e.g., nano sized) silica fumes evenly dispersed throughout the concrete matrix of the concrete In accordance with the invention, a preferred method of reinforcing concrete products comprises mixing (a) cement, (b) acrylic coated carbon fibers having a length of about 2½ inches to about 6 inches (more preferably about 2½ inches to about 3½ inches, and even more preferably about 3 inches) (c) water, and optionally (d) silica fumes and/or slag and/or stone and/or sand and/or other aggregates together to form a slurry wherein the carbon fibers are dispersed evenly throughout the slurry, and letting the slurry set in a form to cure the cement and form bonds between the cement and the carbon fibers, thereby obtaining reinforced concrete.

The inclusion of carbon fibers, in accordance with the invention, improves the strength, flexibility, toughness and weather or environmental properties of the concrete products. Concrete products of the present invention have improved flexural and deflection properties, improved impact strength and ductility, and improved permeability and compression properties.

As used herein, the reference to concrete products includes cement products, as well as other products comprising cement and aggregate.

The concrete products produced in accordance with the present invention may preferably include barriers, in particular, jersey barriers, and terrorist barriers, including panels. In addition, the concrete products produced in accordance with the invention may comprise bridge decks, pre-cast concrete structures, pavements, slabs-on-grade, pipes, wall and floor panels, post-tensioned beam anchorage zones, as well as other uses where traditional concrete products have been used. The concrete products of the invention also have use in seismic applications.

DETAILED DESCRIPTION OF THE PREFERRED EMBODIMENTS

Figure 1:
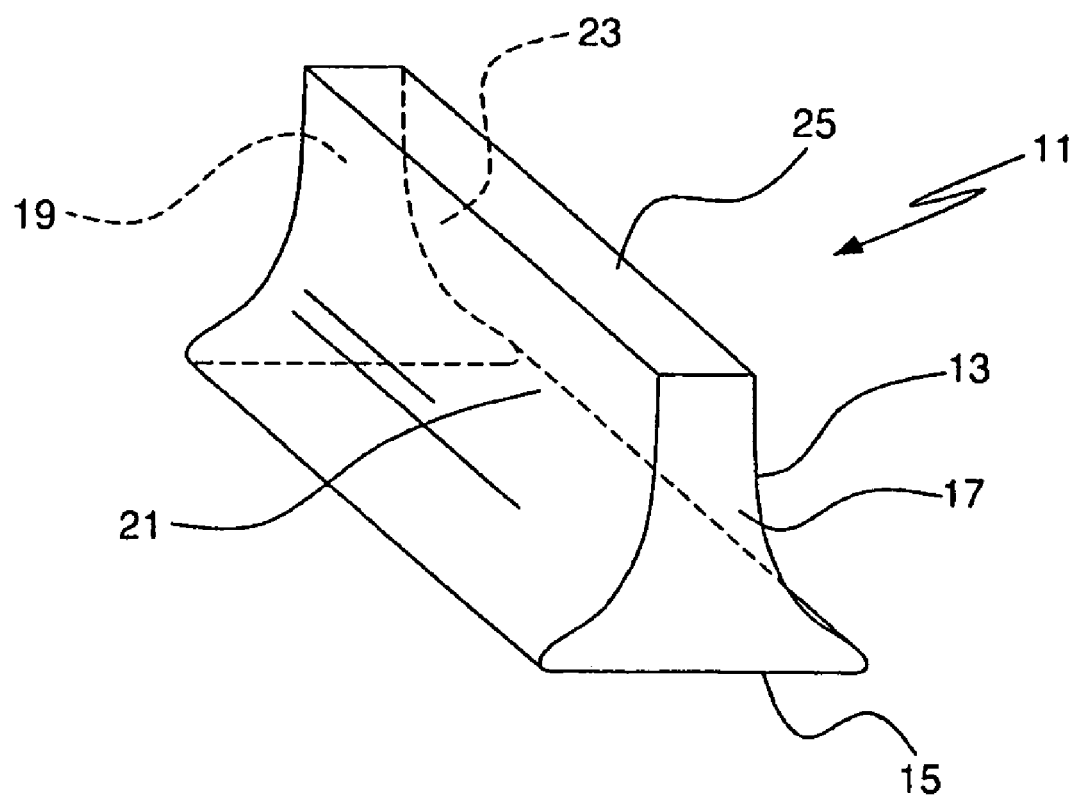
FIG. 1 is a view in perspective of a concrete product constructed in accordance with the invention.

A concrete product in accordance with the invention comprises concrete and carbon fibers dispersed therein.

Preferably, the concrete is made from cement, such as Portland cement, or a mixture comprising cement, such as Portland cement, and silica fumes and/or slag and/or stone and/or sand and/or other aggregates. For example, in one embodiment, slag may be present in an amount of up to about 25% of the weight of dry ingredients of the concrete. For example, Portland cement components may include calcium (Ca), silica (Si), aluminum (Al), and iron (Fe). The calcium may be provided in the form of limestone or calcium carbonate ($CaCO_3$), and the silica may be provided in the form of sand ($SiO_2$), shale and/or clay, which may contain silicon dioxide, aluminum oxides, and iron (III) oxides, and iron ore. Suitable aggregate may include stone, slag, rock, ores, and other materials. Alternatively, the concrete may comprise Portland cement without the addition of aggregate.

The carbon fibers preferably are in the form of carbon graphite fibers having a length of about 2½ inches to about 6 inches, preferably about 2½ inches to about 3½ inches, and more preferably about 3 inches. The carbon graphite fibers may be based, for example, upon pan carbon, pitch carbon, rayon and cotton carbon. Preferably, the carbon fibers have approximately 500,000-pound tensile strength and approximately 32-million-modulus. Preferably, each carbon fiber comprises about 45,000 filaments. The carbon fibers may be provided in the form of a carbon yarn comprising a plurality of filaments.

Acrylic resin is used to coat the carbon fibers to increase the rigidity of (or stiffen) the carbon fibers to facilitate even dispersion of the carbon fibers in the inventive concrete slurry (and subsequently in the concrete product formed from the slurry) by preventing the fibers from balling up (pilling up) in the inventive concrete slurry. Also, the acrylic coating provides the carbon fiber with resistance against water absorption (e.g., provides hydrophobic properties to the carbon fiber). The acrylic coating helps control the water content in the carbon fibers by acting as a water resistant barrier to block water in the slurry from being absorbed by the carbon fiber. Preferred methods for applying the acrylic resin to the carbon fibers include methods known in the textile industry, such as bathing, padding, spraying, foaming or applying by transfer roll, followed by curing, such as in a curing oven. Application of the acrylic resin to the carbon fiber may also be accomplished by using conventional pressurized impregnation methods. Preferably, the acrylic resin is coated on the carbon fibers in a sufficient amount to provide adequate coating on and impregnation of the acrylic resin into the carbon fibers to provide adequate hydrophobic properties to the carbon fiber to guard against the absorption by the carbon fiber of too much water from the slurry, to provide adequate rigidity to the carbon fiber to prevent pilling up (balling up) of the carbon fiber to facilitate even dispersion of the carbon fibers in the concrete slurry, and to facilitate bonding between the carbon fiber and the concrete in the concrete matrix of the concrete product. A preferable acrylic content is from 8% to 20% (and preferably about 17%) by weight of the coated carbon fiber.

Preferably, the acrylic coated carbon fibers are slightly flattened, preferably by the use of a roller. For example, carbon fibers may be moved through an acrylic bath to coat and impregnate the carbon fibers with an acrylic resin, and the acrylic coated carbon fibers may be flattened by moving them through a roller positioned in the acrylic bath. This flattening of the fibers improves the dispersabililty of the carbon fibers in the concrete slurry, as well as in the dry concrete mix of the invention.

After the curing step, the acrylic coated carbon fiber is cut, preferably using a chopper, into the desired length (about 2½ inch to about 6 inch lengths, with about 2½ inch to about 3½ inch lengths being more preferred, and about 3 inch lengths being even more preferred) for use.

The acrylic coating on the carbon fibers increases the rigidity of the carbon fibers, which helps prevent balling up or pilling up of the fibers. As a result, the carbon fibers, rather than balling up (pilling up), disperse in an extended non-balled up form throughout the inventive slurry and the inventive mix. The flattening of the acrylic coated carbon fibers helps expose more of the filaments of the carbon fiber, which leads to greater penetration of the acrylic resin into the carbon fiber. The acrylic coating also provides a water resistance to the carbon fiber to help prevent it from picking up moisture when placed in the concrete slurry.

It is believed that the acrylic resin opens up the carbon fiber and the filaments thereof to permit the cement to penetrate into the interstices of the carbon fibers and the filaments thereof to form strong bonds between the cement and the carbon fiber.

In a preferred embodiment, the acrylic coated carbon fibers are evenly dispersed throughout the inventive concrete slurry to obtain a concrete matrix in the concrete product formed from the slurry having the acrylic coated carbon fibers evenly dispersed throughout it, thereby, facilitating the prevention of cracking and separation of the concrete matrix.

In a preferred embodiment of the invention, the inventive concrete product comprises concrete having about 2½ inch long to about 6 inch long (more preferably about 2½ inch long to about 3½ inch long, and even more preferably about 3 inch long) acrylic coated carbon fibers evenly dispersed throughout the concrete matrix of the concrete, and small (e.g., nano sized) silica fumes evenly dispersed throughout the concrete matrix of the concrete, and optionally slag and/or stone and/or sand and/or other aggregates. The nano-size silica fumes fill the small voids in the concrete matrix of the concrete product, thereby decreasing the water permeability of the concrete product. By decreasing the water permeability of the concrete product, the concrete product becomes more resistant against water degradation. Further, by decreasing the water permeability of the concrete product, the concrete product becomes more resistant against any metal reinforcement rods (i.e., rebar) or mesh contained in the concrete product weakening due to rusting.

The inventive concrete slurry may be prepared by mixing (a) the cement, (b) the acrylic coated carbon fibers, (c) water, and optionally (d) silica fumes and/or slag and/or stone and/or sand and/or other aggregates together, preferably in a cement mixer. Preferably the acrylic coated fibers are uniformly dispersed throughout the slurry. Preferably, water is added to the cement and any of the optional components to form a wet mixture in the cement mixer, and then the acrylic coated carbon fibers are fed into the wet mixture, slowly at first and then at a faster rate, until the carbon fibers have been evenly dispersed throughout the wet mixture. A preferred water/cement ratio for the slurry is 0.444. After placing the slurry in a form or the like, it may be allowed to set to form the inventive concrete product.

The invention also includes a concrete mix comprising (a) cement, preferably Portland cement (b) acrylic coated carbon fibers having a length of about 2½ inches to about 6 inches, preferably about 2½ inches to about 3½ inches, and more preferably about 3 inches, and optionally (c) silica fumes and/or slag and/or stone and/or sand and/or other aggregates. Preferably, the acrylic coated carbon fibers are uniformly dispersed throughout the mix. In a preferred embodiment of the invention, concrete products are produced from the inventive mix by gradually stirring water into the mix, preferably using a cement mixer, to form a cement slurry, mixing the slurry to adequately disperse the components of the mix throughout the slurry, placing the slurry in a form or the like, and letting the concrete set.

Concrete may be varied in composition so as to provide the desired characteristic properties required for a particular application. For example, a concrete slurry in accordance with the invention may contain 10 to 18% cement, 60 to 80% aggregate, 15 to 20% water, and 0.5 to 2% carbon fibers. Entrained air in the slurry may take up to about 8%. Additionally, in accordance with the invention, concrete slurries having different percentages of components than those percentages of the example of this paragraph are included in this invention.

In a preferred embodiment of the invention, a concrete product is produced from a mixture comprising from about 97.5%-99% by dry weight of cement, and from about 1% to about 2% dry weight of acrylic coated carbon fibers. Alternately, slag may be added to the mixture, with the slag component being present in an amount of up to about 25% by dry weight of the mixture, the fiber content preferably in an amount of from about 1% to about 2% by dry weight of the mixture, and the cement being present in an amount of from about 74% to 98% by dry weight of the mixture. In a particularly preferred embodiment, the slag is present in an amount of about 25% by dry weight, the cement is present in an amount of about 74% by dry weight, and the carbon fibers are present in an amount of about 1.5% by dry weight. In preferred embodiments of the invention, the acrylic coated carbon fibers are provided in a range of about 1% to about 2% by weight of the concrete mix or concrete product, with 1.5% by weight of the concrete mix or concrete product being more preferred.

Under tensile stresses, the fibers bridge the cracks and restrain the widening of the concrete by providing pullout resistance. The fibers lead to the improvement of the post peak ductility and toughness of the material. The formation of cracked systems in the cement is minimized or prevented, thus increasing the tensile strength on the overall toughness of the inventive composite material. The carbon fibers do not rust, have super tensile strength, and are inert to chemicals.

The concrete products of the invention have improved performance characteristics over conventional concrete products. For example, the concrete products of the invention have improved overall strength. The overall strength is improved to provide the finished concrete product with a stronger matrix. In accordance with the invention, the inclusion of the carbon graphite fibers to cement improves the performance characteristics of the resulting concrete product with respect to degradation, deterioration, crumbling, cracking and separation, and the inclusion of such carbon graphite fibers to the concrete increases the post-cracking resistance of the resulting concrete product that helps prevent deteriorated concrete from separating. The advantageous properties of the inventive concrete product also include providing the concrete with a very high impact resistance and a very high abrasion resistance. The inventive concrete material holds together under high impact force and resists spalling, resulting in a virtually shatterproof product. The inventive concrete product has a substantially shatterproof performance characteristic.

The method of reinforcing the concrete comprises the steps of mixing (a) cement, (b) acrylic coated carbon fibers having a length of about 2½ inches to about 6 inches (more preferably about 2½ inches to about 3½ inches, and even more preferably about 3 inches) (c) water, and optionally (d) silica fumes and/or slag and/or stone and/or sand and/or other aggregates together to form a slurry wherein the carbon fibers are dispersed evenly throughout the slurry, and letting the slurry set in a form to cure the cement and form bonds between the cement and the carbon fibers, thereby obtaining reinforced concrete.

The following examples are illustrative of the invention.

In each of the following examples, the cement, the acrylic coated carbon fibers, and any optional components such as silica fumes, slag, stone, sand, and/or other aggregates are mixed with sufficient water to form the concrete slurry. Preferably, using a cement mixture, water is added to the cement and any of the optional components (i.e., silica fumes, slag, stone, sand, and/or other aggregates) to form a wet mixture in the cement mixer, and then the acrylic coated carbon fibers are fed into the wet mixture, slowly at first and then at a faster rate, until the carbon fibers have been evenly dispersed throughout the wet mixture.

Alternatively, a dry concrete mix may be prepared by mixing the cement, the acrylic coated carbon fibers, and any optional components (i.e., silica fumes, slag, stone, sand, and/or other aggregates) together. Then, preferably using a cement mixer, sufficient water is gradually stirred into the dry mix to form the cement slurry.

The cement slurry is placed in a form or the like, and is allowed to set to form the inventive concrete product.

Example I

| Component | Weight | Percent by Weight |
|---|---|---|
| Cement | 800 lbs | 98.5% |
| 2½ in. to 3½ in. long acrylic coated carbon fibers | 12 lbs | 1.5% |
| Total | 812 lbs | 100% |

Example II

| Component | Weight | Percent by Weight |
|---|---|---|
| Cement | 800 lbs | 98.5% |
| 2½ in. to 6 in. long acrylic coated carbon fibers | 12 lbs | 1.5% |
| Total | 812 lbs | 100% |

Example III

| Component | Weight | Percent by Weight |
|---|---|---|
| Cement | 800 lbs | 98.5% |
| 3 in. long acrylic coated carbon fibers | 12 lbs | 1.5% |
| Total | 812 lbs | 100% |

Example IV

| Component | Weight | Percent by Weight |
|---|---|---|
| Cement | 782 lbs | 97.75% |
| 2½ in. to 3½ in. long acrylic coated carbon fibers | 12 lbs | 1.5% |
| Silica fumes | 6 lbs | 0.75% |
| Total | 800 lbs | 100% |

Example V

| Component | Weight | Percent by Weight |
|---|---|---|
| Cement | 782 lbs | 97.75% |
| 2½ in. to 6 in. long acrylic coated carbon fibers | 12 lbs | 1.5% |
| Silica fumes | 6 lbs | 0.75% |
| Total | 800 lbs | 100% |

Example VI

| Component | Weight | Percent by Weight |
|---|---|---|
| Cement | 782 lbs | 97.75% |
| 3 in. long acrylic coated carbon fibers | 12 lbs | 1.5% |
| Silica Fumes | 6 lb | 0.75% |
| Total | 800 lbs | 100% |

Example VII

| Component | Weight | Percent by Weight |
|---|---|---|
| Cement | 600 lbs | 73.9% |
| Slag | 200 lbs | 24.6% |
| 2½ in. to 3½ in. long acrylic coated carbon fibers | 12 lbs | 1.5% |
| Total | 812 lbs | 100% |

Example VIII

| Component | Weight | Percent by Weight |
|---|---|---|
| Cement | 600 lbs | 75% |
| Slag | 182 lbs | 22.75% |
| 2½ in. to 3½ in. long acrylic coated carbon fibers | 12 lbs | 1.5% |
| Silica fumes | 6 lbs | 0.75% |
| Total | 800 lbs | 100% |

Sample IX

| Component | Weight | Percent by Weight |
|---|---|---|
| Cement | 600 lbs | 75% |
| Slag | 182 lbs | 22.75% |
| 6 in. long acrylic coated carbon fibers | 12 lbs | 1.5% |
| Silica fumes | 6 lbs | 0.75% |
| Total | 800 lbs | 100% |

Example X

| Component | Weight | Percent by Weight |
|---|---|---|
| Cement | 600 lbs | 75% |
| Slag | 182 lbs | 22.75% |
| 3 in. long acrylic coated carbon fibers | 12 lbs | 1.5% |
| Silica fumes | 6 lbs | 0.75% |
| Total | 800 lbs | 100% |

Example XI

| Component | Weight | Percent by Weight |
|---|---|---|
| Cement | 600 lbs | 16% |
| Slag | 200 lbs | 5% |
| 2½ in. to 3½ in. long acrylic coated carbon fibers | 56 lbs | 1% |
| Stone | 1,864 lbs | 49% |
| Sand | 1,108 lbs | 29% |
| Total Weight: | 3,828 lbs | 100% |

Example XII

| Component | Weight | Percent by Weight |
|---|---|---|
| Cement | 600 lbs | 16% |
| Slag | 200 lbs | 5% |
| 3 in. long acrylic coated carbon fibers | 56 lbs | 1% |
| Stone | 1,864 lbs | 49% |
| Sand | 1,108 lbs | 29% |
| Total Weight: | 3,828 lbs | 100% |

Example XIII

| Component | Weight | Percent by Weight |
|---|---|---|
| Cement | 600 lbs | 15.7% |
| Slag | 171.5 lbs | 4.5% |
| 6 in. long acrylic coated carbon fibers | 67.5 lbs | 1.8% |
| Stone | 1,864 lbs | 48.9% |
| Sand | 1,108 lbs | 29.1% |
| Total | 3,811 lbs | 100% |

Example XIV

| Component | Weight | Percent by Weight |
| --- | --- | --- |
| Cement | 600 lbs | 15.7% |
| Slag | 171.5 lbs | 4.5% |
| 2½ in. to 3½ in. long acrylic coated carbon fibers | 39 lbs | 1% |
| Silica fumes | 28.5 lbs | 0.8% |
| Stone | 1,864 lbs | 48.9% |
| Sand | 1,108 lbs | 29.1% |
| Total | 3,811 lbs | 100% |

Example XV

| Component | Weight | Percent by Weight |
| --- | --- | --- |
| Cement | 600 lbs | 15.7% |
| Slag | 171.5 lbs | 4.5% |
| 2½ in. to 3½ in. long acrylic coated carbon fibers | 39 lbs | 1% |
| Micron sized carbon graphite fibers | 28.5 lbs | 0.8% |
| Stone | 1,864 lbs | 48.9% |
| Sand | 1,108 lbs | 29.1% |
| Total | 3,811 lbs | 100% |

Example XVI

| Component | Weight | Percent by Weight |
| --- | --- | --- |
| Cement | 600 lbs | 15.7% |
| Slag | 171.5 lbs | 4.5% |
| 2½ in. to 3 in. long acrylic coated carbon fibers | 53.24 lbs | 1.4% |
| Silica fumes | 14.25 lbs | 0.4% |
| Stone | 1,864 lbs | 48.9% |
| Sand | 1,108 lbs | 29.1% |
| Total | 3,811 lbs | 100% |

Example XVII

| Component | Weight | Percent by Weight |
| --- | --- | --- |
| Cement | 600 lbs | 15.7% |
| Slag | 148.53 lbs | 3.9% |
| 2½ in. to 3½ in. long acrylic coated carbon fibers | 76.22 lbs | 2.0% |
| Silica fumes | 14.25 lbs | 0.4% |
| Stone | 1,864 lbs | 48.9% |
| Sand | 1,108 lbs | 29.1% |
| Total | 3,811 lbs | 100% |

Turning to FIG. 1, there is shown a concrete product 11, in the form of a barrier, constructed in accordance with the invention. The exemplary concrete product 11 shown in the drawing comprises a body 13 having a base 15, a front face 17, a rear face 19, side faces 21 and 23, and an upper end surface 25. Concrete products 11 are produced using the method set out above from (a) cement, preferably Portland cement, (b) carbon fiber coated with an acrylic resin, and optionally (c) silica fumes and/or slag and/or stone and/or sand and/or other aggregates.

The concrete products of the present invention include Jersey barriers and terrorist barriers, including panels. Among other products which may be produced in accordance with the present invention are included: precast (non-pre-stressed) panels, such as for example, tilt-up wall panels, floor panels, and the like), bridge decks, post-tensioned beam anchorage zones, pre-cast beams, pipes, slab-on-grade, seismic applications, as well as airstrip pavement.

The invention claimed is:

1. A concrete product comprising a concrete matrix, and carbon fibers evenly dispersed throughout the concrete matrix, the carbon fibers having an acrylic resin coating, the carbon fibers having a length of 2½ inches to 6 inches.

2. The concrete product of claim 1, the carbon fibers having a unidirectional fiber configuration.

3. The concrete product of claim 1, the carbon fibers having a length of 2½ inches to 3½ inches.

4. The concrete product of claim 1, the carbon fibers having a length of 3 inches.

5. The concrete product of claim 1, further including silica fumes.

6. The concrete product of claim 1, further including aggregate.

7. The concrete product of claim 1, further including slag.

8. The concrete product of claim 1, wherein carbon fibers are provided in the form of a carbon yarn comprising a plurality of filaments.

9. A dry concrete mix comprising concrete and carbon fibers, the carbon fibers being evenly dispersed throughout the concrete mix, the carbon fibers having an acrylic resin coating and the carbon fibers having a length of 2½ inches to 6 inches.

10. The dry concrete mix of claim 9, the carbon fibers having a unidirectional fiber configuration.

11. The dry concrete mix of claim 9, the carbon fibers having a length of 2½ inches to 3½ inches.

12. The dry concrete mix of claim 9, the carbon fibers having a length of 3 inches.

13. The dry concrete mix of claim 9, further including silica fumes.

14. The dry concrete mix of claim 9, further including aggregate.

15. The dry concrete mix of claim 9, further including slag.

16. The dry concrete mix of claim 9, wherein carbon fibers are provided in the form of a carbon yarn comprising a plurality of filaments.

17. A method of reinforcing concrete, comprising the steps of
mixing cement, carbon fibers coated with an acrylic resin coating, and water together to form a slurry,
the carbon fibers having a length of 2½ inches to 6 inches,
the carbon fibers being evenly dispersed throughout the slurry, and
letting the slurry set to cure the cement and form bonds between the cement and the carbon fibers, thereby obtaining reinforced concrete.

18. The method of claim 17, the carbon fibers having a unidirectional fiber configuration.

19. The method of claim 17, the carbon fibers having a length of 2½ inches to 3½ inches.

20. The method of claim 17, the carbon fibers having a length of 3 inches.

21. The method of claim 17, further including mixing silica fumes with the cement, the carbon fibers, and the water to form the slurry.

22. The method of claim 17, further including mixing aggregate with the cement, the carbon fibers, and the water to form the slurry.

23. The method of claim 17, further including mixing slag with the cement, the carbon fibers, and the water to form the slurry.

24. The method of claim 17, wherein carbon fibers are provided in the form of a carbon yarn comprising a plurality of filaments.

* * * * *